(12) United States Patent
Yamashita et al.

(10) Patent No.: US 7,745,045 B2
(45) Date of Patent: Jun. 29, 2010

(54) LAMINATED FILM AND SECONDARY BATTERY COMPRISING THE SAME

(75) Inventors: Takanori Yamashita, Tokyo (JP);
Masataka Okushita, Tokyo (JP);
Youichi Mochizuki, Tokyo (JP)

(73) Assignee: Dai Nippon Printing Co., Ltd., Tokyo (JP)

(*) Notice: Subject to any disclaimer, the term of this patent is extended or adjusted under 35 U.S.C. 154(b) by 934 days.

(21) Appl. No.: 11/258,951

(22) Filed: Oct. 27, 2005

(65) Prior Publication Data
US 2006/0093906 A1 May 4, 2006

(30) Foreign Application Priority Data
Oct. 29, 2004 (JP) ............................. 2004-315617

(51) Int. Cl.
*H01M 2/04* (2006.01)
*B32B 27/00* (2006.01)

(52) U.S. Cl. ...................... 429/176; 428/461

(58) Field of Classification Search ................. 428/458
See application file for complete search history.

(56) References Cited

U.S. PATENT DOCUMENTS 7,048,822 B2 * 5/2006 Yamashita et al. .......... 156/334
7,285,334 B1 * 10/2007 Yamashita et al. .......... 428/458
2004/0067376 A1 * 4/2004 Arao et al. .................. 428/467

FOREIGN PATENT DOCUMENTS

| JP | 4-58146 A | 2/1992 |
| JP | 7-19589 A | 1/1995 |
| JP | 2000-340187 A | 12/2000 |
| JP | 2000-357494 A | 12/2000 |
| JP | 2001-347513 A | 12/2001 |
| WO | WO00/62354 | * 10/2000 |

* cited by examiner

*Primary Examiner*—Nam X Nguyen
*Assistant Examiner*—Ashley Kwon
(74) *Attorney, Agent, or Firm*—Birch, Stewart, Kolasch & Birch, LLP

(57) ABSTRACT

The present invention relates to a layered product in which at least an aluminum foil, a chemical conversion layer, an olefinic resin layer having an adhesive property to metal and a thermal bonding resin layer are successively laminated on a substrate layer. A fluororesin layer, formed by a fluorine-containing copolymer having a crosslinking group and a curing agent that reacts with the crosslinking group, is formed between the olefinic resin layer and the thermal bonding resin layer.

7 Claims, 3 Drawing Sheets

LAMINATED FILM AND SECONDARY BATTERY COMPRISING THE SAME

BACKGROUND OF THE INVENTION

Field of the Invention

This invention relates to a secondary battery, and more particular, concerns a layered product that packages a lithium battery main body having an electrolyte (such as a liquid electrolyte and a solid electrolyte) and a secondary battery including such a layered product.

The lithium battery, which is also referred to as a lithium secondary battery, is a battery that is composed of a solid polymer, a gel polymer, a liquid or the like serving as an electrolyte and generates electricity through movements of lithium ions, and includes such a battery in which a positive-electrode/negative-electrode active material is formed from a macromolecule polymer. The lithium secondary battery is constituted by a lithium battery main body composed of a positive-electrode collector material (aluminum, nickel)/a positive-electrode active substance layer (a positive-electrode material such as a metal oxide, carbon black, a metal sulfide, an electrolyte solution and a polymer exemplified by polyacrylonitrile)/an electrolyte (carbonate electrolyte such as polypropylene carbonate, ethylene carbonate, dimethyl carbonate and ethylene methylcarbonate, an inorganic solid electrolyte made from lithium salt, or gel electrolyte)/a negative-electrode active substance layer (a negative-electrode material such as lithium metal, alloy, carbon, electrolyte solution and a polymer exemplified by polyacrylonitrile)/a negative-electrode collector material (copper, nickel or stainless); and an outer jacketing member that houses those elements. The lithium secondary battery, which has a high volume efficiency and weight efficiency, is widely used for electronic apparatuses and electronic parts, in particular, for cellular phones, notebook-type personal computers, video cameras and the like.

The outer jacketing member for a lithium battery is mainly classified into one type in which a metal can having a cylinder shape, a rectangular parallelepiped shape or the like is sealed through a metal joining process and the other type in which a layered product having flexibility is thermally-bonded and sealed, and from the viewpoints of easiness for taking out metal terminals, easiness for sealing and flexibility, layered products formed by laminating plastic films and metal foils such as aluminum or the like, which can be formed into an appropriate shape suitable for a space of an electronic apparatus or an electronic part so that the shape of the electronic apparatus or the electronic part is freely designed to a certain degree to easily achieve a small-size, light-weight, have come to be used.

Since the layered product requires properties that are demanded as a lithium battery, such as a vapor proofing property, a sealing property, an anti-piercing property, an insulating property, heat resistant and cold resistant property, an anti-electrolyte property (electrolyte solution resistant property) and a corrosion resistant property (resistance to hydrofluoric acid generated by deterioration of electrolyte and hydrolysis) as indispensably essential properties, a layered product, which has a structure constituted by a substrate layer that provides the anti-piercing property and prevents current conduction from the outside, a barrier layer, made of a metal foil such as aluminum or the like, which ensures a vapor proofing property, and an inner layer that has a superior adhesive property to metal terminals that are connected to the respective positive electrodes and negative electrodes of the lithium battery main body in a manner so as to stick outside, or an inner layer that has a thermal adhesive property so as to ensure the sealing property, is generally used.

With respect to the structure of the lithium battery, a bag type, as shown in FIG. 2(b), in which the above-mentioned layered product is processed into a bag shape with peripheral thermally bonded portions as shown in FIG. 2(a) [FIG. 2(a) shows a pillow type packaging bag; however, a packaging bag of a three-way type or a four-way type may be used] with a lithium battery main body (not shown) being housed therein, with metal terminals, connected to the respective positive electrode and negative electrode, sticking outside, and with the opening section being sealed through a thermal bonding process, may be used, or a molded type, as shown in FIG. 3(b), in which the layered product is press-molded to form a concave section as shown in FIG. 3(a), with a lithium battery main body (not shown) being housed in the concave section, with metal terminals, connected to the respective positive electrode and negative electrode, sticking outside, and with the concave section being coated with a sheet-shaped layered product prepared as a separated member and the four peripheral edges being thermally bonded to be sealed, may be used. Although not shown in Figures, the molded type includes another molded type in which, in place of the sheet-shaped packaging member that covers the concave section, a press-molded material, as shown in FIG. 3(a) is used so that concave sections are formed on both of the sides that are sealed by thermally bonding four peripheral edges. The bag type or the molded type shown in FIGS. 2 and 3, are taken as the modes of the lithium battery of the present invention. Reference numerals 11, 12, 13 and 14, shown in FIGS. 2 and 3, represent layered products, a symbol D represents a lithium battery, a symbol S represents a peripheral thermally bonded portion and a symbol T represents a metal terminal.

In any of the lithium batteries of the abovementioned modes, upon sealing the lithium battery main body with a layered product, it is necessary to carry out a sealing process, with metal terminals, respectively connected to the positive electrode and negative electrode of the lithium battery main body, being allowed to stick outside, and with the metal terminals being thermally bonded while being sandwiched between layered products. For this reason, generally, a method is used in which a thermally adhesive resin having a superior adhesive property to metal, for example, an acid-modified olefin resin that has been graft-modified by unsaturated carboxylic acid, is used for the inner layer of the layered product so as to be thermally bonded and sealed, or another method is used in which a general olefinic resin (that refers to a straight-chain or a branched-chain olefinic resin made from carbon and hydrogen, and hereinafter, referred to as general polyolefinic resin) that is inferior in adhesive property to metal is used for the inner layer is used, with a metal terminal portion sealing adhesive film, made from the above-mentioned acid-modified olefin resin, having a superior adhesive property with metal being interposed between the metal terminals and the inner layer, so as to be thermally bonded and sealed.

In this case, however, in order to surely seal the metal terminals through a thermal bonding process with the metal terminals being sandwiched between layered products, it is necessary to prepare a quantity of heat required in association with heat, pressure and time, and in the case when the quantity of heat is too high, the metal terminals come into contact with a barrier layer of the layered product made of metal foil such as aluminum to cause a problem of short-circuiting; therefore, strict condition managements for the thermally bonding and sealing processes are required. For this reason, layered products that can alleviate these condition managements, that is, layered products that cannot be easily short-circuited even in the case of excessive quantity of heat, have been demanded. Another problem is that, when any force is applied to the inside end portion of a portion thermally bonded (thermally bonded portion), a crack tends to occur in the inside end portion, with the result that the electrolyte solution invades from the cracked portion to corrode the barrier layer made of metal foil such as aluminum to impair functions as a battery.

There is a problem that since the layer structure of the layered product is constituted by a barrier layer made of a substrate layer and metal foil such as aluminum and an inner layer, as described earlier, and a lithium hexafluorophosphate solution is used as the electrolyte solution in a lithium battery main body, and this reacts with moisture to generate hydrofluoric acid, with the result that this hydrofluoric acid permeates into the inner layer of the layered product to cause degradation in the adherence between the metal foil and the inner layer, resulting in peeling and the subsequent short service life of the battery; therefore, it is required for the layered product used for a lithium battery to have a performance for blocking moisture from invading therein from the outside air.

For this reason, with respect to the lamination method of the barrier layer made of metal foil such as aluminum and the inner layer, a thermal lamination method (for example, see Patent Document 2), which can reduce moisture permeation from the end face in comparison with a dry lamination method (for example, see Patent Document 1) that uses a known dry lamination-use adhesive agent of a polyester material or the like, although the productivity (processability) is inferior, is normally adopted. The reason for this is explained as follows: the applied thickness of known dry lamination-use adhesive agent after having been dried is about 3 to 5 μm; however, the moisture permeation from the end face of the adhesive agent is great, with the result that moisture invaded from the end face penetrates the inner layer to react with the electrolyte solution to generate hydrofluoric acid, causing separation between the barrier layer made of metal foil such as aluminum and the inner layer with a lapse of time.

Another attempt has been made in which a corrosion resistant coat film is formed on the face on the inner layer side of the barrier layer made of metal foil such as aluminum of a layered product so as to prevent the separation between the barrier layer and the inner layer (for example, see Patent Document 3). This technique disclosed by Patent Document 3 has an arrangement in which, by forming a coat film subjected to a chroming treatment as a corrosion resistant coat film, the separation between the barrier layer made of metal foil such as aluminum and the inner layer is prevented; however, this coat film subjected to a chroming treatment is formed by using a conventionally known chromate treatment solution mainly composed of chromium oxide and polyacrylic acid, or chromium oxide and phosphoric acid, or chromium oxide so that this technique is effective to prevent the separation between the barrier layer made of metal foil such as aluminum and the inner layer for a certain fixed period, and forms an important method; however, as a result of acceleration tests, a problem arises in which the bonding strength is lowered with a lapse of time.

[Patent Document 1] Japanese Patent Publication No. 7-19589

[Patent Document 2] Japanese Patent Publication No. 4-58146

[Patent Document 3] Japanese Patent Application Laid-Open No. 2000-357494

SUMMARY OF THE INVENTION

Problems to be Solved by the Invention

The present invention relates to a layered product used for a lithium battery of a type in which a lithium battery main body is sandwiched with metal terminals, respectively connected to positive electrode and negative electrode thereof, sticking outside, and thermally bonded to be sealed, and the objective of the present invention is to provide a layered product in which the bonding strength is made stronger in a portion on an inner side from metal foil and which is superior in an electrolyte solution resistant property, an anti-cracking property, an anti-short-circuiting property for preventing short-circuiting between the metal foil and the terminals, and a water-vapor barrier property. Another objective is to provide a layered product for use in a lithium battery, which has the above-mentioned properties and is also superior in the productivity.

Means to Solve the Problems

In order to achieve the above-mentioned objectives, a layered product in accordance with the present invention has a structure in which at least a substrate layer, an aluminum foil, a chemical conversion layer, an olefinic resin layer having an adhesive property to metal and a thermal bonding resin layer are successively laminated, and a fluororesin layer, formed by a fluorine-containing copolymer having a crosslinking group and a curing agent that reacts with the crosslinking group, is interposed between the olefinic resin layer and the thermal bonding resin layer.

With this arrangement, since the olefinic resin layer having an adhesive property to metal and the thermal bonding resin layer are laminated with the fluororesin layer that is superior in a water vapor-barrier property, heat resistance and adhesive property being interposed in between; therefore, it becomes possible to provide a layered product that hardly has moisture permeation, and is superior in electrolyte solution resistance, anti-cracking property and anti-short-circuiting property.

With respect to the layered product of the present invention, an acid-modified polyolefinic resin may be used as the olefinic resin layer.

With respect to the layered product of the present invention, a polyolefinic resin or an acid-modified polyolefinic resin may be used as the thermal bonding resin layer.

With respect to the layered product of the present invention, a material that contains at least a fluoro-olefin monomer and a hydroxyl-group-containing monomer as monomer components may be used as the fluorine-containing copolymer.

With respect to the layered product of the present invention, an organic polyisocyanate compound may be used as the curing agent.

With respect to the layered product of the present invention, the chemical conversion layer may be formed by using a chemical conversion solution containing an aminated phenolic polymer, a trivalent chromium compound and a phosphorous compound. With this arrangement, it is possible to provide a layered product that is superior in the bonding strength between the aluminum foil and the olefinic resin layer having an adhesive property to metal.

The following secondary battery may be formed by using the layered product of the present invention. In other words, the secondary battery is characterized to have a structure in which a battery container is sealed with a plurality of leads, respectively joined to the positive electrode and the negative electrode of the battery main body, sticking out of the battery container, and in this structure, the battery container is made of a layered product formed by successively laminating at least a substrate layer, an aluminum foil, a chemical conversion layer, an olefinic resin layer having an adhesive property to metal and a thermal bonding resin layer, and a fluororesin layer, formed by a fluorine-containing copolymer having a crosslinking group and a curing agent that reacts with the crosslinking group, is interposed between the olefinic resin layer and the thermal bonding resin layer.

EFFECTS OF THE INVENTION

In the layered product of the present invention, since a fluororesin layer formed by a fluorine-containing copolymer having a crosslinking group and a curing agent that reacts with the crosslinking group is formed between an olefinic resin layer having an adhesive property to metal and a thermal bonding resin layer, it becomes possible to obtain the following effects: the bonding strength is made stronger in a portion on an inner side from metal foil, and superior properties, such as an electrolyte solution resistant property, an anti-cracking property, an anti-short-circuiting property and a water-vapor barrier property, can be obtained. The secondary battery using the layered product of the present invention is superior in reliability and has a longer service life.

REFERENCE NUMERALS

Figure 1:
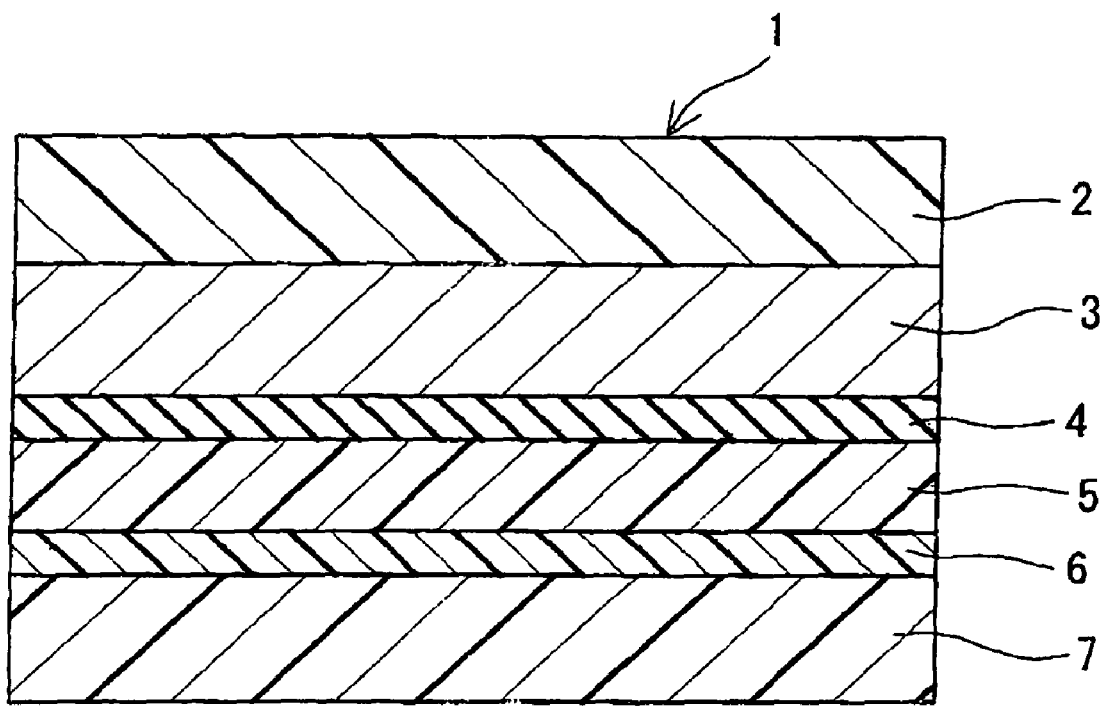
FIG. 1 is a schematic sectional view that shows a layer structure of one embodiment of a layered product in accordance with the present invention.

1 Layered product
2 Substrate layer
3 Aluminum foil
4 Chemical conversion layer
5 Olefinic resin layer having an adhesive property to metal
6 Fluororesin layer
7 Thermal bonding resin layer

DETAILED DESCRIPTION OF THE INVENTION

Referring to Figures, the following description will discuss the present invention in detail.

FIG. 1 is a schematic drawing that shows a layer structure of one embodiment of a layered product in accordance with the present invention, and a layered product 1 has a structure in which an aluminum foil 3, a chemical conversion layer 4, an olefinic resin layer 5 having an adhesive property to metal, a fluororesin layer 6 and a thermal bonding resin layer 7 are successively laminated on a substrate layer 2.

Figure 3A:
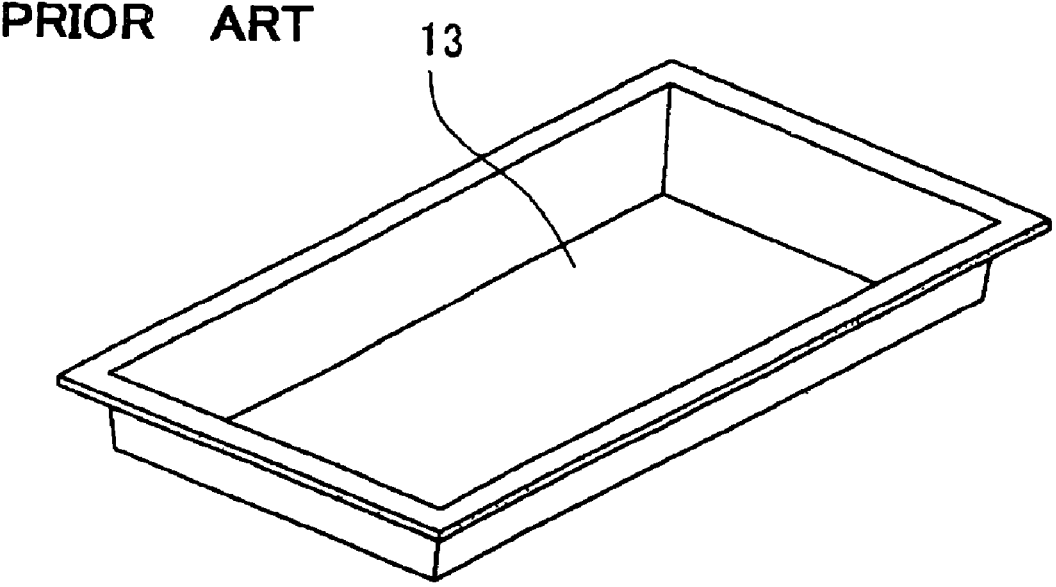
FIG. 3A is a schematic perspective view that shows one example of a structure of a conventional layered product.
Figure 3B:
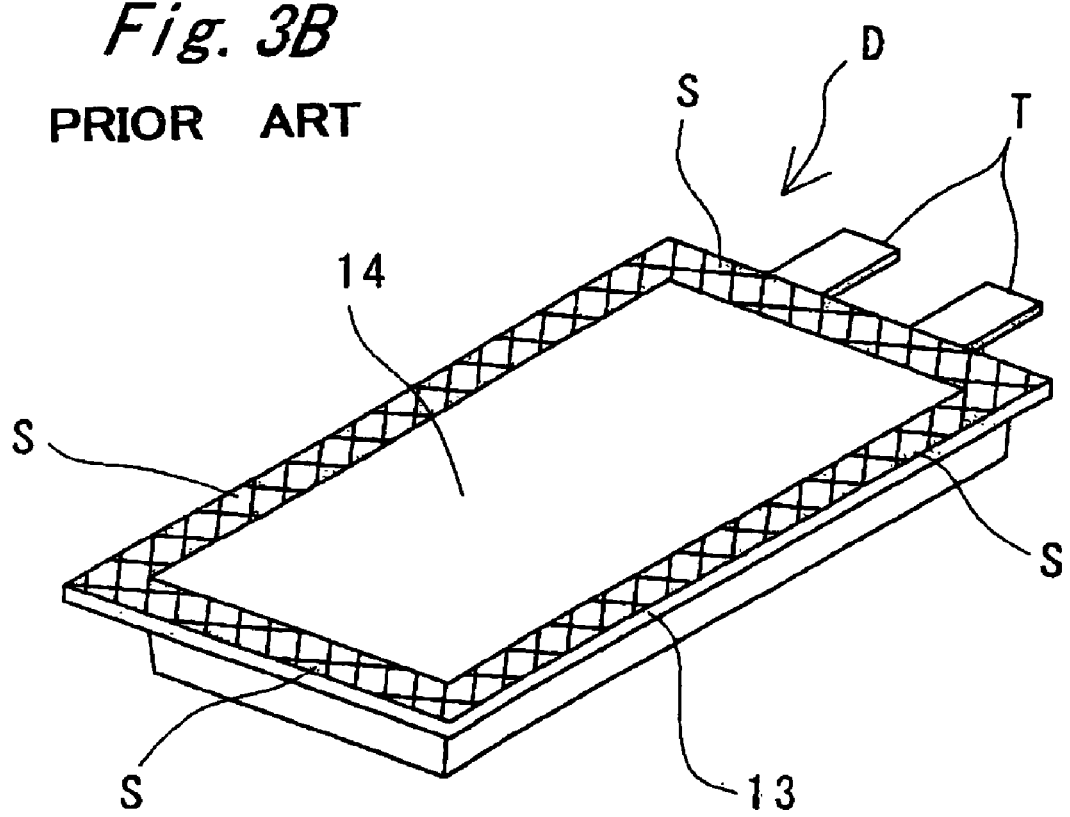
FIG. 3B is a schematic perspective view that shows one example of a structure of a conventional lithium battery.

The substrate layer, which is formed so as to protect the aluminum foil which will be described later, and also to improve an anti-piercing property, in particular, against a piercing force externally applied, is made of a polyester film or a polyamide film that is extended in the biaxial directions because of its superior mechanical strength, or a laminated film of these. With respect to the polyester film, examples thereof include films made from polyethylene terephthalate (hereinafter, referred to as PET), polybutylene terephthalate, polyethylene naphthalate (hereinafter, referred to as PEN), polybutylene naphthalate, polycarbonate or the like. With respect to the polyamide film, examples thereof include films made from nylon 6 (hereinafter, referred to as ON), nylon 6,6, and nylon 6,10. The thickness of the substrate layer 2 is preferably set to 6 μm or more. The reason for this is explained as follows: the thickness thinner than 6 μm causes the possibility of pinholes in its layer and a reduction in protective effects of the aluminum foil against an external force, and in particular, in the case of the molded type (see FIG. 3), pinholes and tearing tend to occur in the aluminum foil, resulting in failure in molding; therefore, the thickness is preferably set to 12 μm or more. When, regardless of whether it is a single layer or a multi-layered film, the substrate layer is thicker than 25 μm, remarkable effects are not obtained from the viewpoint of protection of the aluminum foil against an external force to cause a reduction in the volume and weight energy density; therefore, the application of such a substrate layer is not preferable from the viewpoint of a relationship between costs and effects. The above-mentioned polyester film and polyamide film may be subjected to an easy-bonding treatment such as a corona-discharging process, an ozone treatment and a plasma treatment, on its necessary surface.

The following description will discuss the aluminum foil. The aluminum foil, which is formed so as to prevent water vapor from entering the inside of a battery from outside, is preferably designed to have a thickness from 20 to 100 μm, from the viewpoints of ensuring an appropriate water vapor barrier property and processability during a processing operation. When the thickness is thinner than 20 μm, the of the aluminum foil itself may have pinholes, causing a higher risk of water vapor invasion, while, when the thickness is thicker than 100 μm, no remarkable effects are obtained in the pinhole prevention in the aluminum foil, failing to further improve the water vapor barrier property to cause a reduction in the volume and weight energy density; therefore, the application of such a substrate layer is not preferable from the viewpoint of a relationship between costs and effects.

In comparison with the aluminum foil not containing an iron component, the aluminum foil preferably contains an iron component in a range from 0.3 to 9.0 wt. %, preferably from 0.7 to 2.0 wt. %, and the aluminum foil of this type is superior in spreading property, and free from the occurrence of pinholes due to bending; therefore, in particular, in order to obtain a molded product that is evenly formed without a biased thickness upon press-molding (see FIG. 3), it is preferable to use an aluminum foil containing an iron component in the layered product 1. In the case of the iron content of less than 0.3 wt. %, no effects are obtained in the prevention of occurrence of pinholes as well as in the spreading property, and the iron content exceeding 9.0 wt. % causes degradation in flexibility as aluminum foil and the subsequent degradation in molding applicability.

Figure 2A:
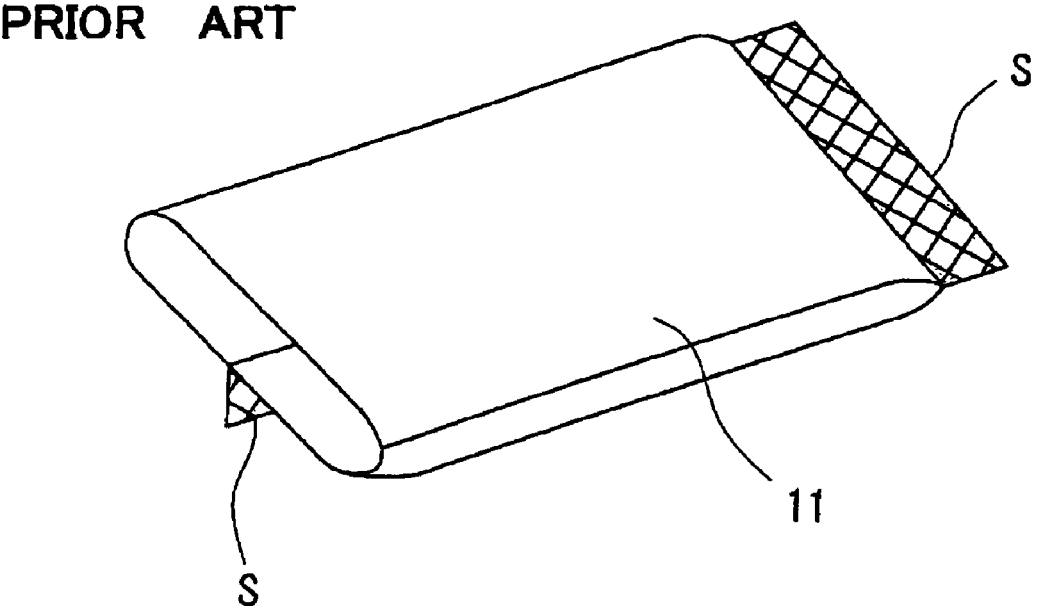
FIG. 2A is a schematic perspective view that shows one example of a structure of a conventional lithium battery.
Figure 2B:
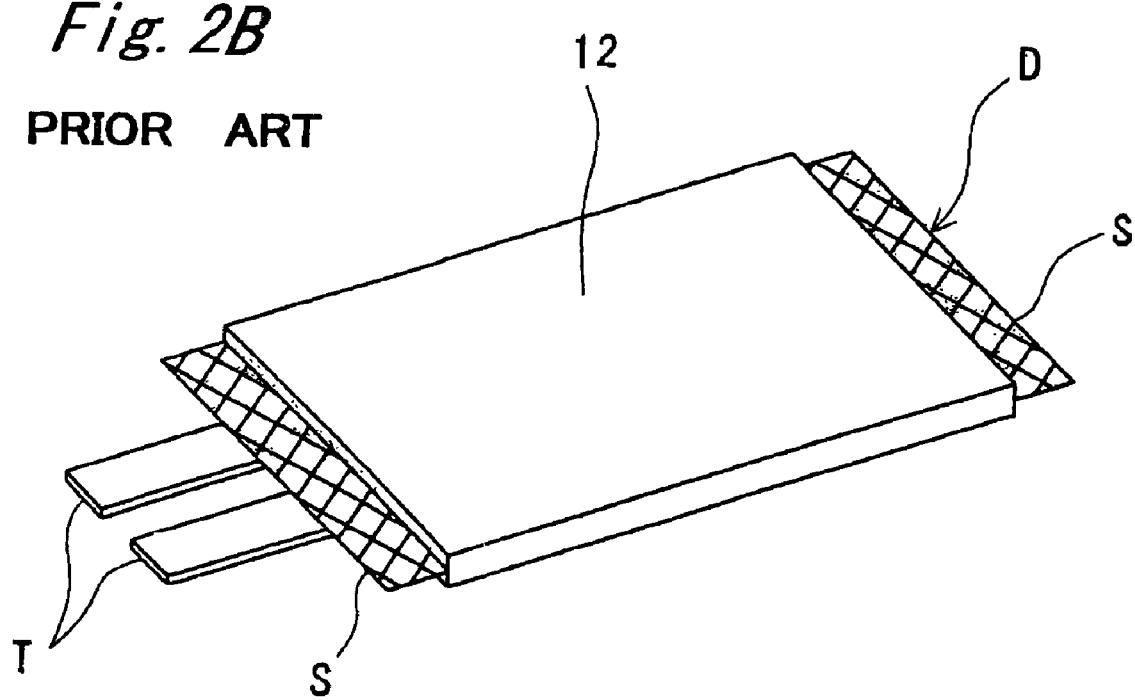
FIG. 2B is a schematic perspective view that shows another example of a structure of a conventional lithium battery.

The aluminum foil is manufactured by a cold rolling process, and its flexibility, toughness and hardness are changed depending on the annealing conditions (so-called tempering process) thereof, and the aluminum foil to be used in the present invention is preferably prepared not as a hardened product that has not been subjected to an annealing process, but rather as an aluminum foil that is comparatively softened through a slightly or completely annealing treatment. The annealing conditions that determine the flexibility, toughness and hardness of the aluminum foil are appropriately determined on demand, depending on whether the layered product 1 is used as a bag type product (see FIG. 2) or as a molded type product (see FIG. 3).

The following description will discuss the chemical conversion layer. The chemical conversion layer, which is used for allowing the aluminum foil to firmly adhere to the olefinic resin layer (hereinafter, referred to as a metal-adhesive olefinic resin layer) having an adhesive property to metal so as to prevent delamination due to hydrofluoric acid generated by an electrolyte solution and hydrolysis of the electrolyte solution, as well as for preventing delamination upon press-molding operation in the case of a molded-type product. The chemical conversion layer is formed on the surface of the aluminum foil through a chromium-conversion treatment, such as a chromic acid chromate treatment, a phosphoric acid chromate treatment and a coating-type chromate treatment, or a non-chromium-conversion treatment (coating-type) that uses a material such as zirconium, titanium and zinc phosphate; and from the viewpoints of a firm bonding property to the metal-adhesive olefinic resin layer and low processing costs derived from the capability of continuous processes without the necessity of a water-washing process, the chemical conversion layer is preferably formed by a coating-type formation treatment, in particular, by using a treatment solution containing an aminated phenolic polymer, a trivalent chromic compound and a phosphorous compound.

First, the following description will discuss the aminated phenolic polymer. With respect to the aminated phenolic polymer, those conventionally known polymers may be widely used; for example, one kind or two or more kinds of aminated phenolic polymers composed of repetitive units indicated by the following formulas (1), (2), (3) and (4) are used. Preferably, an aminated phenolic polymer indicated by formula (1) is used. In the formula, X represents a hydrogen atom, a hydroxyl-group, an alkyl group, a hydroxyalkyl group, an allyl group or a benzyl group, and more preferably, represents any one of a hydrogen atom, a hydroxyl-group and a hydroxyalkyl group. $R_1$ and $R_2$ represent a hydroxyl-group, an alkyl group and a hydroxyalkyl group, and may be the same group or different groups.

In the following formulas (1) to (4), examples of the alkyl groups represented by X, $R_1$ and $R_2$ include straight-chain or branched-chain alkyl groups having carbon atoms of 1 to 4, such as a methyl group, an ethyl group, an n-propyl group, an isopropyl group, an n-butyl group, an isobutyl group and a tert-butyl group. Examples of the hydroxyalkyl group represented by X, $R_1$ and $R_2$ include straight-chain or branched-chain alkyl groups having carbon atoms of 1 to 4 with one of the hydroxy group being substituted, such as a hydroxymethyl group, 1-hydroxyethyl group, 2-hydroxyethyl group, 1-hydroxypropyl group, 2-hydroxypropyl group, 3-hydroxypropyl group, 1-hydroxybutyl group, 2-hydroxybutyl group, 3-hydroxybutyl group and 4-hydroxybutyl group.

The aminated phenolic polymer, represented by the following formula (1) or (3), is an aminated phenolic polymer containing about 80 mol % or less of repeating units, preferably repeating units at a rate of about 25 to about 55 mol %. The number-average aminated phenolic polymer is preferably set to about 500 to 1,000,000, preferably about 1000 to 20,000. The aminated phenolic polymer is manufactured by polycondensing, for example, a phenolic compound or a naphthol compound with formaldehyde to first form a polymer made from repeating units represented by the following formulas (1) or (3), and a water-soluble functional group ($-CH_2NR_1R_2$) is then introduced into this polymer by using formaldehyde and amine ($R_1R_2NH$). One kind of the aminated phenolic polymer may be used, or two or more kinds thereof may be used in a mixed manner.

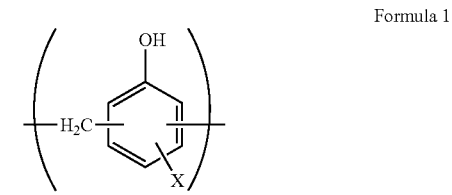

Formula 1

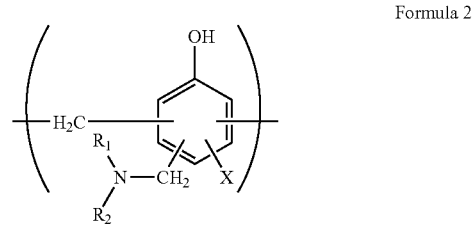

Formula 2

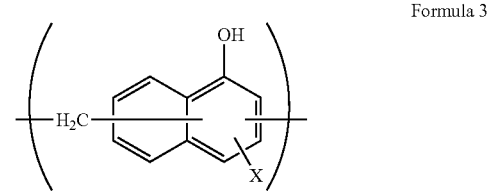

Formula 3

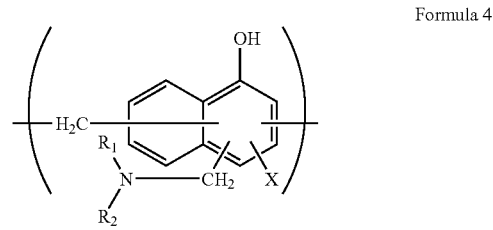

Formula 4

The following description will discuss the trivalent chromium compound. With respect to the trivalent chromium compound, those of conventionally known compounds may be widely used, and examples thereof include: chromium nitrate, chromium fluoride, chromium sulfate, chromium acetate, chromium oxalate, chromium biphosphate, acetylacetate chromate, chromium chloride and potassium chromium sulfate, and preferably, chromium sulfate and chromium fluoride may be used.

The following description will discuss the phosphorous compound. With respect to the phosphorous compound, those of conventionally known compounds may be widely used, and examples thereof include: condensed phosphoric acid such as phosphoric acid and polyphosphoric acid, and salts of these. With respect to the salts, examples thereof include: ammonium salts and alkali metal salts such as sodium salt and potassium salt.

The chemical conversion layer 4, formed by using a treatment solution containing an aminated phenolic polymer, a trivalent chromium compound and a phosphorous compound, preferably contains at a rate of about 1 to 200 mg of the aminated phenolic polymer, about 0.5 to 50 mg of the trivalent chromium compound in chromium conversion, and about 0.5 to 50 mg of the phosphorous compound in phosphorous conversion, per 1 $m^2$ of the layer, and preferably contains at a rate of about 5.0 to 150 mg of the aminated phenolic polymer, about 1.0 to 40 mg of the trivalent chromium compound in chromium conversion, and about 1.0 to 40 mg of the phosphorous compound in phosphorous conversion, per 1 $m^2$ of the layer. In this case, with respect to the drying temperature, a heating process (baking process) is preferably carried out at a temperature from 150 to 250° C., preferably from 170 to 250° C.

With respect to the forming method of the chemical conversion layer, the treatment solution is applied by using a conventionally known coating method, appropriately selected bar coating, roll coating, gravure coating or dip coating. Prior to forming the chemical conversion layer, the aluminum foil surface is preliminarily subjected to a known degreasing treatment such as an alkali dipping method, an electrolytic washing method, an acid washing method, an electrolytic acid washing method and an acid activation method; thus, the functions of the chemical conversion layer are desirably exerted to the maximum, and maintained for a long time.

The following description will discuss the metal adhesive olefinic resin layer. With respect to the metal adhesive olefinic resin layer, an acid-modified polyolefin resin, for example, a polyolefin resin graft-modified by unsaturated carboxylic acid and an acid-modified polyolefin resin, such as a copolymer between ethylene or propylene and acrylic acid or methacrylic acid, may be used, and preferably, the polyolefin resin graft-modified by unsaturated carboxylic acid is used to form the layer. The reason for this is because, in comparison with the acid-modified polyolefin resin, such as a copolymer between ethylene or propylene and acrylic acid or methacrylic acid, the polyolefin resin graft-modified by unsaturated carboxylic acid is superior in heat resistance. The thickness of the metal adhesive olefinic resin layer is preferably set in a range from 5 to 20 μm, preferably from 10 to 15 μm, and the thickness of less than 5 μm fails to provide sufficient laminate strength, while the thickness exceeding 20 μm tends to cause an increase in moisture permeation from the end face, resulting in degradation in functions as a battery. By taking into consideration the adhesive property to the fluororesin layer, which will be described later, the exposed surface of the metal adhesive olefinic resin layer is subjected to an easy bonging treatment, such as a corona discharging process, an ozone treatment and a plasma treatment.

The following description will discuss the fluororesin layer. The fluororesin layer is used for bonding the metal adhesive resin layer 5 and the thermal bonding resin layer to each other, as well as for making the bonding strength stronger in a portion on the inner side from the metal foil. The fluororesin to be used in the present invention is a fluororesin formed by a fluorine-containing copolymer having a crosslinking group and a curing agent that reacts with the crosslinking group. With respect to the fluorine-containing copolymer having a crosslinking group, those polymers, which are soluble to a generally-used organic solvent, and contain a hydroxyl-group, an epoxy group, a carboxyl group, an amide group, an amino group or a hydrolytic silyl group as a crosslinking group, may be used. The fluorine-containing copolymer contains at least a fluoro-olefin monomer and a crosslinking group-containing monomer that is copolymerizable with the fluoro-olefin monomer, as its monomer components. Examples of the crosslinking group-containing monomer include: hydroxyl-group containing monomers, such as 2-hydroxyethylvinyl ether, 3-hydroxypropylvinyl ether, 2-hydroxypropylvinyl ether, 2-hydroxy-2-methylpropylvinyl ether, 4-hydroxybutylvinyl ether, 5-hydroxypentylvinyl ether, 6-hydroxyhexylvinyl ether, 2-hydroxyethylallyl ether and 4-hydroxybutylallyl ether; epoxy-group containing monomers, such as glycidylvinyl ether and glycidyl(meth)acrylate; carboxyl-group containing monomers, such as acrylic acid and methacrylic acid; amide-group containing monomers, such as (meth)acrylamide and N-methylol acrylamide; amino-group containing monomers, such as aminoalkylvinyl ether and aminoalkylallyl ether; and hydrolytic silyl-group containing monomers such as trimethoxyvinyl silane, triethoxyvinyl silane and γ-methacryloxypropyl trimethoxy silane; and among these, hydroxyl-group containing monomers are preferably used. This material allows an easy process by using a gravure coating method, and provides an appropriate curing rate.

In order to improve the coating property and film-coating characteristics (hardness, flexibility and the like), in addition to the fluoro-olefin monomer and the crosslinking-group containing monomer, the fluorine-containing copolymer to be used in the present invention may be further copolymerized with a monomer that is copolymerizable with the above-mentioned two kinds of monomers. The fluorine-containing copolymer of the present invention preferably contains as a monomer component at least a fluoro-olefin monomer represented by 1) formula: $CF_2$=CFX [in the formula, X indicates a fluorine atom, a chlorine atom, a hydrogen atom or a trifluoromethyl group] and a hydroxyl-group containing monomer represented by 2) formula: $CH_2$=$CHR_1$ [in the formula, $R_1$ indicates —$OR_2$ or —$CH_2OR_2$ (here, $R_2$ is an alkyl group having a hydroxyl-group)] serving as a crosslinking group containing monomer, and, if necessary, further contains at least one kind of monomer selected from a β-methyl-substituted α-olefin monomer represented by 3) formula: $CH_2$=$CR(CH_3)$ [in the formula, R indicates an alkyl group having 1 to 8 carbon atoms], vinyl ether represented by 4) formula: $CHR_3$=$CHOR_3(CH_3)$ [in the formula, $R_3$ indicates an alkyl group having 1 to 8 carbon atoms], a monomer represented by 5) formula: $CH_2$=$CHR_3$ [in the formula, $R_3$ is —$OR_4$ or —$CH_2OR_4$ (in the formula, $R_4$ indicates an alkyl group having a carboxyl group)] or another monomer 6) which has no crosslinking functional group and is copolymerizable with any of the monomers 1), 2), 3), 4) and 5). More preferably, the copolymer contains all the monomers 1) to 6).

With respect to the fluoro-olefin monomer, examples thereof include tetrafluoroethylene, trifluoroethylene and hexafluoropropylene. Preferably, trifluoroethylene is used, and more preferably, trifluoroethylene represented by the above-mentioned formula 1) with X being a chlorine atom is used. This material provides a high bonding strength. With respect to the β-methyl-substituted α-olefin monomer, examples thereof include isobutylene, 2-methyl-1-pentene and 2-methyl-1-hexene. With respect to another monomer that is copolymerizable with a fluoro-olefin monomer, a β-methyl-substituted α-olefin monomer and a hydroxyl-group containing monomer, examples thereof include: carboxylic acids, such as vinyl acetate, vinylpropionate, vinyl (iso)butyrate, vinyl capronate, vinyl laurate, vinyl stearate, vinyl benzoate, vinyl hexafluoropropionate and vinyl trifluoroacetate; vinyl esters; diesters of maleic acid or fumaric acid, such as dimethyl, diethyl, dipropyl, dibutyl, ditrifluoromethyl, ditrifluoromethyl and dihexafluoropropyl of maleic acid or fumaric acid; alkyl vinyl ethers such as methylvinyl ether, ethylvinyl ether, n-propylvinyl ether, iso-butylvinyl ether and tert-butylvinyl ether; cycloalkylvinyl ethers, such as cyclopentylvinyl ether and cyclohexylvinyl ether; vinyl ethers having an aromatic group such as benzylvinyl ether; or fluoroalkylvinyl ethers such as perfluoroethylvinyl ether and perfluoropropylvinyl ether; and in addition to these, crotonic acid, vinyl acetate, maleic acid, styrene and the like may be used.

The fluorine-containing copolymer to be used in the present invention, which contains monomers represented by 1) formula and 2) formula as essential components, is obtained by adding at least one kind of monomer selected from the monomers of 3) to 6) thereto on demand so as to be copolymerized through a conventionally known method such as an emulsion polymerizing method, a solution polymerizing method and a suspension polymerizing method. The fluorine-containing copolymer is designed to have a number-average molecular weight measured by GPC in a range from 1000 to 500000, preferably from 3000 to 100000.

With respect to the curing agent to be used in the present invention, those compounds which react with the crosslinking group to form a crosslinked bond may be used. With respect to the curing agent used for the hydroxyl-group containing monomer, those compounds containing an isocyanate group or a carboxyl group may be used, and an organic polyisocyanate compound having an isocyanate group is preferably used. Examples of the organic polyisocyanate compound include: 2,4-tolylene diisocyanate, diphenylmethane-4,4'-diisocyanate, xylylene diisocyanate, isophorone diisocyanate, lysine methylester diisocyanate, methylcyclohexyl diisocyanate, trimethylhexamethylene diisocyanate, hexamethylene diisocyanate and n-pentane-1, 4-diisocyanate, and trimers thereof, adducts or burette compound thereof or these polymers having two or more isocyanate groups, or isocyanates formed into blocks may also be used. Preferably, trimers of isophorone diisocyanate or hexamethylene diisocyanate may be used. This is because these have good compatibility with the fluorine-containing copolymer, provide an appropriate curing rate, and are superior in solvent resistance and chemical resistance. With respect to the curing agent used for epoxy-group containing monomers, examples thereof include: compounds having a hydroxyl-group, a carboxyl group, an amide group, an amino group or an isocyanate group. With respect to the curing agent used for carboxyl-group containing monomers, examples thereof include compounds having a hydroxyl-group, an amino group, an isocyanate group or an epoxy group. With respect to the curing agent used for amide-group containing monomers, examples thereof include compounds having an epoxy group. With respect to the curing agent used for amino-group containing monomers, examples thereof include compounds having a carboxyl group, an epoxy group or an isocyanate group. The curing agent used for hydrolytic silyl-group containing monomers, examples thereof include compounds having an amino group or an isocyanate group.

With respect to the above-mentioned compounds having a hydroxyl-group, examples thereof include 1,4-bis-2'-hydroxyethoxy benzene and bishydroxyethyl terephthalate. With respect to the compounds having a carboxyl group, examples thereof include aliphatic dibasic acids, such as fumaric acid, succinic acid, adipic acid and azelaic acid, and acid anhydrides, such as phthalic anhydride. With respect to the compounds having an epoxy group, examples thereof include terephthalic acid diglycidyl esters and paraoxy benzoic acid diglycidyl esters.

The following description will explain the preparation method of the fluororesin layer to be used in the present invention by exemplifying the fluorine-containing copolymer containing a hydroxyl-group. A fluorine-containing copolymer containing a hydroxyl-group and a curing agent are dissolved in a solvent in which one or two kinds or more of acetic acid esters, ketones, ethers, aromatic hydrocarbons and the like have been mixed so that the curing agent is added to the fluorine-containing copolymer so as to be set in a range from 0.1 to 5.0 equivalents, preferably from 0.5 to 1.5 equivalents, with respect to one equivalent of the hydroxyl-group (—OH group) in the fluorine-containing copolymer, and the resulting solution is applied to a face of a metal adhesive olefinic resin layer that has been subjected to an easy-bonding treatment to be dried thereon, by using a conventionally known coating method such as a roll coating method, a gravure coating method and a bar coating method; thus, the fluororesin layer is formed. The amount of coat of the fluororesin layer is properly set so that the amount of coat after the drying process becomes 3.0 to 5.0 $g/m^2$. The reason for this is explained as follows: in order to maintain the laminate strength, the amount of coat of 3.0 $g/m^2$ or more is required, and from the viewpoints of prevention of moisture invasion from the end face and costs, the amount of coat is preferably set to 5.0 $g/m^2$ or less. The thickness of the fluororesin layer is set to 2 to 6 μm, preferably to 3 to 5 μm.

The following description will discuss the thermal bonding resin layer. With respect to the thermal bonding resin layer, the kind of resin is differently determined depending on whether or not a metal-terminal-portion sealing adhesive film is interposed between the thermal bonding resin layer and the metal terminals upon thermally bonding and sealing these members, with the metal terminals, respectively connected to the positive and negative electrodes of the lithium battery main body, sticking outside. In the case when the metal-terminal-portion sealing adhesive film is interposed in between, a film made from a simple substance or a mixture of ethylenic resins, such as low-density polyethylene, middle-density polyethylene, high-density polyethylene, linear low-density polyethylene and ethylene-butene copolymers, and propylene-resins, such as homopolypropylene, ethylene-propylene copolymer and ethylene-propylene-butene copolymer, is appropriately selected on demand, and used, and in the case when no metal-terminal-portion sealing adhesive film is interposed, a film made from the same kind of resin as the metal adhesive olefinic resin layer may be used. With respect to the thickness of the thermally adhesive resin layer, it is set to 5 to 20 μm, preferably to 10 to 15 μm, and the thickness of less than 5 μm fails to provide a sufficient laminate strength, while the thickness exceeding 20 μm tends to cause an increase in moisture permeation from the end face, resulting in degradation in performances as a battery. The metal adhesive olefinic resin layer and the thermal bonding resin layer can be laminated by a conventionally-known dry lamination method with a fluororesin layer interposed therebetween.

Although not shown in Figures, the laminated layers of the substrate layer and the aluminum foil can be formed by using a known dry lamination adhesive agent such as a polyester agent, a polyether-agent and a polyurethane-agent through a known dry lamination method. In the case when the layered product is applied to a molded-type film (see FIG. 3), the aforementioned chemical conversion layer 4 is preferably formed on the aluminum foil surface on the side on which the substrate layer 2 is laminated. This arrangement is made so as to prevent delamination between the aluminum foil 3 and the outer layer 2 upon press-molding, and in the case of the bag-type (see FIG. 2), it is not necessarily required to form this structure. In the case when the layered product is applied to a molded-type film (see FIG. 3), in an attempt to prevent the layered product from partially adhering to the metal mold upon press-molding and consequently to prepare a uniform press-molded product without a biased thickness (deviations in thickness) (that is, in an attempt to improve the moldability upon press-molding), for example, a lubricant layer may be formed on the surface of the substrate layer 2 by applying a lubricant, such as a hydrocarbon-material like fluidizing paraffin, a fatty acid material like stearic acid and erucic acid, a fatty acid amide-material like stearyl amide and erucic acid amide, metal soap, natural wax and silicone, that has been dissolved into an appropriate solvent and formed into an applicable state, through a known coating method such as a gravure coating method, a roll coating method, or a gravure printing method in the case where a pattern-shaped layer is formed.

After laminating processes in which a substrate layer/an aluminum foil/a chemical conversion layer/a metal adhesive olefinic resin layer/a fluororesin layer/a thermal bonding resin layer have been successively laminated, the layered product is subjected to a heating process at a temperature higher than the softening point of a resin to be used as the metal adhesive olefinic resin layer, preferably at a temperature higher than the melting point thereof, so that the interlayer adhesive strength between the chemical conversion layer and the metal adhesive olefinic resin layer can be improved; thus, it becomes possible to provide a film that is superior in chemical resistance, heat resistance and solvent resistance, and maintains stable properties for a long time.

EXAMPLES

The following description will discuss the present invention in detail by means of examples.

[Preparation of Substrate Layer Composed of Two Layers]

A biaxial stretched PET film of 9 μm in thickness and a biaxial stretched ON film of 15 μm in thickness were laminated with a two-pack curable polyurethane-bonding agent interposed in between to prepare a substrate layer composed of the two layers [biaxial stretched PET film 9 μm/biaxial stretched ON film 15 μm].

[Preparation of First Intermediate Layered Product]

An aluminum foil (100 μm in thickness) was preliminarily processed by using a chemical conversion solution containing an aminated phenolic polymer, a trivalent chromium compound and a phosphorous compound so that chemical conversion layers were formed on both of the faces thereof, and a biaxial stretched PEN film of 12 μm in thickness was laminated on one of the faces of the foil, with a two-pack curable polyurethane-bonding agent interposed in between, to prepare a first intermediate layered product [biaxial stretched PEN film 12 μm/chemical conversion layer/aluminum foil 100 μm/chemical conversion layer].

[Preparation of Second Intermediate Layered Product]

An aluminum foil (100 μm in thickness) was preliminarily processed by using a chemical conversion solution containing an aminated phenolic polymer, a trivalent chromium compound and a phosphorous compound so that chemical conversion layers were formed on both of the faces thereof, and the ON face of the substrate layer composed of two layers was laminated on one of the faces of the foil, with a two-pack curable polyurethane bonding agent interposed in between, to prepare a second intermediate layered product [biaxial stretched PET film 9 μm/biaxial stretched ON film 15 μm/chemical conversion layer/aluminum foil 100 μm/chemical conversion layer].

[Preparation of Third Intermediate Layered Product]

An aluminum foil (80 μm in thickness) was preliminarily processed by using a chemical conversion solution containing an aminated phenolic polymer, a trivalent chromium compound and a phosphorous compound so that chemical conversion layers were formed on both of the faces thereof, and the ON face of the substrate layer composed of two layers was laminated on one of the faces of the foil, with a two-pack curable polyurethane bonding agent interposed in between, to prepare a third intermediate layered product [biaxial stretched PET film 9 μm/biaxial stretched ON film 15 μm/chemical conversion layer/aluminum foil 80 μm/chemical conversion layer].

[Preparation of Fourth Intermediate Layered Product]

An aluminum foil (40 μm in thickness) was preliminarily processed by using a chemical conversion solution containing an aminated phenolic polymer, a trivalent chromium compound and a phosphorous compound so that chemical conversion layers were formed on both of the faces thereof, and the ON face of the substrate layer composed of two layers was laminated on one of the faces of the foil, with a two-pack curable polyurethane bonding agent interposed in between, to prepare a fourth intermediate layered product [biaxial stretched PET film 9 μm/biaxial stretched ON film 15 μm/chemical conversion layer/aluminum foil 40 μm/chemical conversion layer].

[Preparation of Fifth Intermediate Layered Product]

An aluminum foil (40 μm in thickness) was preliminarily processed by using a chemical conversion solution containing an aminated phenolic polymer, a trivalent chromium compound and a phosphorous compound so that chemical conversion layers were formed on both of the faces thereof, and a biaxial stretched ON film of 25 μm in thickness was laminated on one of the faces of the foil, with a two-pack curable polyurethane bonding agent interposed in between, to prepare a fifth intermediate layered product [biaxial stretched ON film 25 μm/chemical conversion layer/aluminum foil 40 μm/chemical conversion layer].

In the following Example 1 to 6, a fluoro-olefin-hydroxyl-group containing vinyl ether copolymer was used as the fluorine-containing copolymer, and a trimer of hexamethylene diisocyanate that was an isocyanate curing agent was used as the curing agent, unless otherwise defined.

Example 1

Polypropylene, which had been graft-modified by unsaturated carboxylic acid (hereinafter, referred to as PPa), was heated and melt-extruded by a T die extruder onto the chemical conversion face of the first intermediate layered product so as to have a thickness of 15 μm, and the PPa face was subjected to a corona discharging treatment, and to the resulting PPa face that had been subjected to the corona discharging treatment was applied a fluororesin solution in which an isocyanate curing agent was added to the fluorine-containing copolymer so as to be set to 1.1 equivalents with respect to one equivalent of the hydroxyl-group (—OH group) of the polyol to be dried thereon to form the dried weight of 3.0 g/m², and an un-stretched polypropylene film (hereinafter, referred to as CPP film) of 30 μm in thickness was further heated and press-bonded to the surface of the fluororesin layer to prepare a layered product of the present invention [biaxial stretched PEN film 12 μm/chemical conversion layer/aluminum foil 100 μm/chemical conversion layer/PPa 15 μm/fluororesin layer 3.0 g/m²/CPP film 30 μm].

Example 2

Polyethylene, which had been graft-modified by unsaturated carboxylic acid (hereinafter, referred to as PEa), was heated and melt-extruded by a T die extruder onto the chemical conversion face of the second intermediate layered product so as to have a thickness of 12 μm, and the PEa face was subjected to a corona discharging treatment, and to the resulting PEa face that had been subjected to the corona discharging treatment was applied a fluororesin solution in which an isocyanate curing agent was added to the fluorine-containing copolymer so as to be set to 1.1 equivalents with respect to one equivalent of the hydroxyl-group (—OH group) of the polyol to be dried thereon to form the dried weight of 3.0 g/m$^2$, and a CPP film of 30 μm in thickness was further heated and press-bonded to the surface of the fluororesin layer to prepare a layered product of the present invention [biaxial stretched PET film 9 μm/biaxial stretched ON film 15 μm/chemical conversion layer/aluminum foil 100 μm/chemical conversion layer/PEa 15 μm/fluororesin layer 3.0 g/m$^2$/CPP film 30 μm].

Example 3

PEa was heated and melt-extruded by a T die extruder onto the chemical conversion face of the third intermediate layered product so as to have a thickness of 12 μm, and the PEa face was then subjected to a corona discharging treatment, and to the resulting PEa face that had been subjected to the corona discharging treatment was applied a fluororesin solution in which an isocyanate curing agent was added to the fluorine-containing copolymer so as to be set to 1.1 equivalents with respect to one equivalent of the hydroxyl-group (—OH group) of the polyol to be dried thereon to form the dried weight of 3.0 g/m$^2$, and an un-stretched polyethylene film (hereinafter, referred to as PE film) of 30 μm in thickness was further heated and press-bonded to the surface of the fluororesin layer to prepare a layered product of the present invention [biaxial stretched PET film 9 μm/biaxial stretched ON film 15 μm/chemical conversion layer/aluminum foil 80 μm/chemical conversion layer/PEa 15 μm/fluororesin layer 3.0 g/m$^2$/PE film 30 μm].

Example 4

PPa was heated and melt-extruded by a T die extruder onto the chemical conversion face of the third intermediate layered product so as to have a thickness of 12 μm, and the PPa face was then subjected to a corona discharging treatment, and to the resulting PPa face that had been subjected to the corona discharging treatment was applied a fluororesin solution in which an isocyanate curing agent was added to the fluorine-containing copolymer so as to be set to 1.1 equivalents with respect to one equivalent of the hydroxyl-group (—OH group) of the polyol to be dried thereon to form the dried weight of 3.0 g/m$^2$, and a PE film of 30 μm in thickness was further heated and press-bonded to the surface of the fluororesin layer to prepare a layered product of the present invention [biaxial stretched PET film 9 μm/biaxial stretched ON film 15 μm/chemical conversion layer/aluminum foil 80 μm/chemical conversion layer/PPa 12 μm/fluororesin layer 3.0 g/m$^2$/PE film 30 μm].

Example 5

A PPa film of 30 μm in thickness was laminated on the chemical conversion face of the fourth intermediate layered product through a thermal lamination method, and the PPa face was then subjected to a corona discharging treatment, and to the resulting PPa face that had been subjected to the corona discharging treatment was applied a fluororesin solution in which an isocyanate curing agent was added to the fluorine-containing copolymer so as to be set to 1.1 equivalents with respect to one equivalent of the hydroxyl-group (—OH group) of the polyol to be dried thereon to form the dried weight of 3.0 g/m$^2$, and a CPP film of 30 μm in thickness was further heated and press-bonded to the surface of the fluororesin layer to prepare a layered product of the present invention [biaxial stretched PET film 9 μm/biaxial stretched ON film 15 μm/chemical conversion layer/aluminum foil 40 μm/chemical conversion layer/PPa film 30 μm/fluororesin layer 3.0 g/m$^2$/CPP film 30 μm].

Example 6

A PEa film of 30 μm in thickness was laminated on the chemical conversion face of the fourth intermediate layered product through a thermal lamination method, and the PEa face was then subjected to a corona discharging treatment, and to the resulting PPa face that had been subjected to the corona discharging treatment was applied a fluororesin solution in which an isocyanate curing agent was added to the fluorine-containing copolymer so as to be set to 1.1 equivalents with respect to one equivalent of the hydroxyl-group (—OH group) of the polyol to be dried thereon to form the dried weight of 3.0 g/m$^2$, and a CPP film of 30 μm in thickness was further heated and press-bonded to the surface of the fluororesin layer to prepare a layered product of the present invention [biaxial stretched PET film 9 μm/biaxial stretched ON film 15 μm/chemical conversion layer/aluminum foil 40 μm/chemical conversion layer/PEa film 30 μm/fluororesin layer 3.0 g/m$^2$/CPP film 30 μm].

Comparative Example 1

A two-pack curable polyurethane bonding agent was applied onto the chemical conversion face of the fifth intermediate layered product and dried thereon to have a dried weight of 3.0 g/m$^2$, and a CPP film of 30 μm in thickness was heated and press-bonded to the surface of the bonding agent layer to prepare a layered product of Comparative Example [biaxial stretched ON film 25 μm/chemical conversion layer/aluminum foil 40 μm/chemical conversion layer/bonding agent layer 3.0 g/m$^2$/CPP film 30 μm].

Comparative Example 2

Onto the chemical conversion face of the fifth intermediate layered product was heated and melt-extruded PPa through a T die extruder so as to form a thickness of 15 μm, and on this was formed a CPP film of 30 μm in thickness through a sandwich laminating process to prepare a layered product of Comparative Example [biaxial stretched ON film 25 μm/chemical conversion layer/aluminum foil 40 μm/chemical conversion layer/PPa 15 μm/CPP film 30 μm].

Comparative Example 3

Onto the chemical conversion face of the fifth intermediate layered product was heated and melt-extruded PEa through a T die extruder so as to form a thickness of 15 μm, and on this was formed a PE film of 30 μm in thickness through a sandwich laminating process to prepare a layered product of Comparative Example [biaxial stretched ON film 25 μm/chemical conversion layer/aluminum foil 40 μm/chemical conversion layer/PEa 15 μm/PE film 30 μm].

The layered products formed in the above-mentioned Examples 1 to 6 and Comparative Examples 1 to 3 were evaluated on the electrolyte solution resistance, anti-cracking property, anti-short-circuiting property, moisture permeation, volume resistivity and moldability by using the following evaluation methods, and the results of evaluations are collectively shown in Table 1.

TABLE 1

| | Electrolyte solution resistance | Anti-cracking property | Anti-short-circuiting property | Moisture permeation | Moldability |
|---|---|---|---|---|---|
| Example 1 | No peeling | ○ | 10 seconds | 30 ppm | 6 mm |
| Example 2 | No peeling | ○ | 20 seconds | 40 ppm | 10 mm |
| Example 3 | No peeling | ○ | 15 seconds | 30 ppm | 10 mm |
| Example 4 | No peeling | ○ | 15 seconds | 30 ppm | 10 mm |
| Example 5 | No peeling | ○ | 20 seconds | 40 ppm | 6 mm |
| Example 6 | No peeling | ○ | 20 seconds | 40 ppm | 6 mm |
| Comparative Example 1 | Peeling | X (3 V) | 3 seconds | 300 ppm | 6 mm |
| Comparative Example 2 | No peeling | X (3 V) | 3 seconds | 30 ppm | 6 mm |
| Comparative Example 3 | No peeling | X (3 V) | 3 seconds | 30 ppm | 6 mm |

[Evaluation Methods]

(Evaluation Method on Electrolyte Solution Resistance)

A three-way sealed bag having inner dimensions 30×50 mm with a heat-seal width of 7 mm was formed by a layered product filled with 3 g of an electrolyte solution [in which hexafluorophosphate was dissolved in a mixed solution [ethylene carbonate/diethyl carbonate/dimethyl carbonate=1/1/1 (capacity ratio) to form a 1 mol/liter of hexa-fluoric phosphate solution], and after having been stored in a thermostat at 85° C. for 2200 hours, this was opened, and visually observed for any peeling of a layer inner side from the aluminum foil.

(Evaluation Method of Anti-Cracking Property)

The layered product was cut into test samples having a square shape with 100 mm in each side. By using a male mold having a rectangular shape of 33×55 mm and a female mold with a clearance of 0.5 mm to the male mold, each strip-shaped piece was placed on the female mold so as to allow the thermal bonding resin layer side to be positioned on the male mold side with the strip-shaped piece being pressed by a pressing force (face pressure) of 0.1 MPa so that 10 samples, each of which was a molded product with a depth of 3 mm, were formed. Test sample having a square shape with 100 mm in each side was superposed on the molded product so as to allow the thermal bonding resin layer side to face. Then, one end edge was heat-sealed by a heat-sealing machine made of metal-to-metal based heating plates with a 7 mm width (sealing conditions: 190° C.; 1.0 MPa; 3 seconds) to form a thermally bonded portion, and this thermally bonded portion was instantaneously separated from each other by 180 degrees at 10 N/100 mm width, and a portion in the direction orthogonal to the thermally bonded portion was then heat-sealed in the same manner so that a molded body with one side being opened was formed. An electrolyte solution [in which hexafluorophosphate was dissolved in a mixed solution [ethylene carbonate/diethyl carbonate/dimethyl carbonate=1/1/1 (capacity ratio) to form a 1 mol/liter of hexa-fluoric phosphate solution] was poured so that the thermally bonded portion of the molded body separated by 180 degrees was immersed therein. An applied voltage is varied between 1 to 100 V so that the electric resistance between the hydrolyte solution and the aluminum foil of the layered product was measured. The resistance of 10 MΩ or more even under an applied voltage of 100V was evaluated as good, and indicated by O. When even one of the 10 molded products had a resistance of 0.1 MΩ or less, those samples were evaluated as bad, and indicated by x. Those samples indicated by x were shown together with the applied voltage values that were 0.1 MΩ or less.

(Evaluation Method of Anti-Short-Circuiting Property)

The layered product was cut into test samples having a square shape with 60 mm in each side. The layered products were placed with the sealant film faces of the layered products being aligned face to face with each other, and a nickel terminal of 4 mm in width, 55 mm in length and 70 μm in thickness was inserted between the layered products, with terminals of a tester connected to the nickel terminal and the aluminum foil of the layered products. In this state, these were heat-sealed by a heat-sealing machine made of metal-to-metal based heating plates with a 7 mm width (sealing conditions: 190° C.; 1.0 MPa) on both of the upper and lower sides in a direction orthogonal to the length direction of the nickel terminal. A period of time (unit: seconds) up to short-circuiting between the nickel foil and the aluminum foil of the layered product was measured and evaluated.

(Evaluation Method of Moisture Permeability)

The layered product was cut into square-shaped pieces having a size of 120×120 mm. Each piece was folded in two in the MD direction, and one of the short sides was sealed with a width of 10 mm, while the long side was sealed with a width of 3 mm so that a bag was formed with the other short side being opened. After the bag had been dried in a vacuum oven, 3 g of a mixed solution [ethylene carbonate/diethyl carbonate/dimethyl carbonate=1/1/1 (volume ratio)] was injected into the bag in a dry room so that a moisture permeability evaluation sample with the opening section sealed with a width of 10 mm was formed. This moisture permeability evaluation sample was stored in a thermo-hygrostat at 60° C. and 90% RH for seven days so that the increased amount of moisture inside the sample was measured by using Karl Fischer method. The heat sealing conditions on the short side were 190° C., 2.0 MPa and 3.0 seconds, and those on the long side were 190° C., 1.0 MPa and 3.0 seconds.

(Evaluation Method of Moldability)

The layered product was cut into strip-shaped pieces having a size of 100×80 mm. By using a male mold having a rectangular shape of 33×55 mm and a female mold with a clearance of 0.5 mm to the male mold, each strip-shaped piece was placed on the female mold so as to allow the thermal bonding resin layer side being positioned on the male mold side, with the strip-shaped piece being pressed by a pressing force (face pressure) of 0.1 MPa, so that each of 10 samples was cold molded, with the mold depth being changed from a mold depth of 0.5 mm by a unit of 0.5 mm. A mold depth at which none of the ten samples had wrinkles in the packaging material or pinholes and cracks in the aluminum foil was defined as the limited molding depth. The molding depth was shown as an evaluated value.

As clearly indicated by Table 1, the layered products of Examples 1 to 6 achieved superior effects, in particular, in the anti-cracking property and anti-short-circuiting property, in comparison with Comparative Examples of 1 to 3. The layered products of Examples 1 to 6 also achieved superior effects in the moisture permeability (water vapor barrier property), electrolyte solution resistance and moldability. The layered products of Examples 1 to 4 were also superior in productivity upon forming a metal adhesive olefinic resin layer through an extrusion coating method, as well as upon forming a fluororesin layer and a thermal bonding resin layer through a dry lamination method.

What is claimed is:

1. A layered product comprising:
   at least a substrate layer, an aluminum foil, a chemical conversion layer, an olefinic resin layer having an adhesive property to metal, and a thermal bonding resin layer that are successively laminated,
   wherein a fluororesin layer, formed by a fluorine-containing copolymer having a crosslinking group and a curing agent that reacts with the crosslinking group, is interposed between the olefinic resin layer and the thermal bonding resin layer
   wherein the fluorine-containing copolymer contains as a monomer component,
   a fluoro-olefin monomer (1) represented by the formula; $CF_2$=CFX in which X indicates a fluorine atom, a chlorine atom, a hydrogen atom or a trifluoromethyl group,
   a hydroxyl-group-containing monomer (2) represented by the formula: $CH_2$=$CHR_1$ in which $R_1$ indicates —$OR_2$ or —$CH_2OR_2$ ($R_2$ is an alkyl group having a hydroxyl-group) serving as a crosslinking group-containing monomer,
   a β-methyl-substituted α-olefin monomer (3) represented by the formula: $CH_2$=$CR(CH_3)$ in which R indicates an alkyl group having 1 to 8 carbon atoms,
   a vinyl ether monomer (4) represented by the formula: $CHR_3$=$CHOR_3(CH_3)$ in which $R_3$ indicates an alkyl group having 1 to 8 carbon atoms,
   a monomer (5) represented by the formula: $CH_2$=$CHR_3$ in which $R_3$ is —$OR_4$ or —$CH_2OR_4$ ($R_4$ indicates an alkyl group having a carboxyl group), and
   a monomer (6) which has no crosslinking functional group and is copolymerizable with any of the monomers 1), 2), 3), 4) and 5).

2. The layered product according to claim 1, wherein the olefinic resin layer is an acid-modified polyolefinic resin.

3. The layered product according to claim 1, wherein the thermal bonding resin layer is a polyolefinic resin or an acid-modified polyolefinic resin.

4. The layered product according to claim 1, wherein the fluorine-containing copolymer contains at least a fluoro-olefin monomer and a hydroxyl-group-containing monomer as monomer components.

5. The layered product according to claim 1, wherein the curing agent is an organic polyisocyanate compound.

6. The layered product according to claim 1, wherein the chemical conversion layer is formed by a chemical conversion solution containing an aminated phenolic polymer, a trivalent chromium compound and a phosphorous compound.

7. A secondary battery, in which a battery container is sealed with a plurality of leads, respectively joined to the positive electrode and the negative electrode of a battery main body, sticking out of the battery container,
   the battery container being made of a layered product formed by successively laminating at least a substrate layer, an aluminum foil, a chemical conversion layer, an olefinic resin layer having an adhesive property to metal and a thermal bonding resin layer, and
   a fluororesin layer, formed by a fluorine-containing copolymer having a crosslinking group and a curing agent that reacts with the crosslinking group, being interposed between the olefinic resin layer and the thermal bonding resin layer
   wherein the fluorine-containing copolymer contains as a monomer component,
   a fluoro-olefin monomer (1) represented by the formula; $CF_2$=CFX in which X indicates a fluorine atom, a chlorine atom, a hydrogen atom or a trifluoromethyl group,
   a hydroxyl-group-containing monomer (2) represented by the formula: $CH_2$=$CHR_1$ in which $R_1$ indicates —$OR_2$ or —$CH_2OR_2$ ($R_2$ is an alkyl group having a hydroxyl-group) serving as a crosslinking group-containing monomer,
   a β-methyl-substituted α-olefin monomer (3) represented by the formula: $CH_2$=$CR(CH_3)$ in which R indicates an alkyl group having 1 to 8 carbon atoms,
   a vinyl ether monomer (4) represented by the formula: $CHR_3$=$CHOR_3(CH_3)$ in which $R_3$ indicates an alkyl group having 1 to 8 carbon atoms,
   a monomer (5) represented by the formula: $CH_2$=$CHR_3$ which $R_3$ is —$OR_4$ or —$CH_2OR_4$ ($R_4$ indicates an alkyl group having a carboxyl group), and
   a monomer (6) which has no crosslinking functional group and is copolymerizable with any of the monomers 1), 2), 3), 4) and 5).

* * * * *